United States Patent
Katz et al.

(10) Patent No.: US 12,373,235 B1
(45) Date of Patent: Jul. 29, 2025

(54) PHYSICAL HARDWARE CLOCK VIRTUALIZATION

(71) Applicant: Amazon Technologies, Inc., Seattle, WA (US)

(72) Inventors: Noam Katz, Tel Aviv-Jaffa (IL); Amiram Lifshitz, Kfar Hess (IL); Said Bshara, Tira (IL); Erez Izenberg, Tel Aviv-Jaffa (IL); Jonathan Chocron, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 831 days.

(21) Appl. No.: 17/643,017

(22) Filed: Dec. 7, 2021

(51) Int. Cl.
G06F 9/455 (2018.01)
G06F 1/08 (2006.01)
G06F 1/12 (2006.01)

(52) U.S. Cl.
CPC ............ *G06F 9/45558* (2013.01); *G06F 1/08* (2013.01); *G06F 1/12* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,358,653 B1 | 1/2013 | Attig et al. | |
| 8,631,483 B2 | 1/2014 | Soni et al. | |
| 8,837,473 B2 | 9/2014 | Binetti et al. | |
| 9,306,693 B2 | 4/2016 | Tzeng | |
| 9,667,370 B2 | 5/2017 | Tzeng et al. | |
| 10,650,452 B2 | 5/2020 | Parsons et al. | |
| 11,146,485 B1 | 10/2021 | Stein | |
| 11,562,228 B2 | 1/2023 | Ganapavarapu et al. | |
| 2003/0093705 A1* | 5/2003 | Kriz | G06F 1/14 713/600 |
| 2003/0135612 A1 | 7/2003 | Huntington et al. | |
| 2003/0219007 A1 | 11/2003 | Barrack et al. | |
| 2004/0158640 A1 | 8/2004 | Philbrick et al. | |
| 2005/0036512 A1 | 2/2005 | Loukianov | |
| 2005/0165985 A1 | 7/2005 | Vangal et al. | |
| 2006/0251084 A1 | 11/2006 | Elliot | |
| 2009/0132846 A1* | 5/2009 | Song | G06F 1/14 713/502 |

(Continued)

OTHER PUBLICATIONS

W.-C. Hsu, S.-H. Hung and C.-H. Tu, "A Virtual Timing Device for Program Performance Analysis," 2010 10th IEEE International Conference on Computer and Information Technology, Bradford, UK, 2010, pp. 2255-2260. (Year: 2010).*

(Continued)

*Primary Examiner* — Frank D Mills
(74) *Attorney, Agent, or Firm* — Weaver Austin Villeneuve & Sampson LLP (57) ABSTRACT

Techniques to virtualize a physical hardware clock are described. The techniques may include utilizing a coefficients storage to store timestamp coefficient entries. When a timestamp request is received from a client, a selection circuit selects a timestamp coefficient entry from the coefficients storage. A compute circuit then computes a timestamp according to the client's virtualized clock based on the selected timestamp coefficient entry and a counter value of a counter that is driven by a physical clock signal.

21 Claims, 7 Drawing Sheets

(56) References Cited

U.S. PATENT DOCUMENTS

| | | |
|---|---|---|
| 2010/0135325 A1 | 6/2010 | Kim et al. |
| 2011/0197191 A1* | 8/2011 | Malloy ............... G06F 9/45533 |
| | | 718/1 |
| 2012/0014377 A1 | 1/2012 | Joergensen et al. |
| 2013/0089090 A1 | 4/2013 | Binetti et al. |
| 2013/0205123 A1 | 8/2013 | Vorbach |
| 2014/0177653 A1 | 6/2014 | Tzeng |
| 2014/0226683 A1 | 8/2014 | Castiel |
| 2014/0293825 A1 | 10/2014 | Kalkunte et al. |
| 2015/0356031 A1* | 12/2015 | Gintis .................... G06F 11/34 |
| | | 710/61 |
| 2016/0085479 A1 | 3/2016 | Edmiston et al. |
| 2019/0042295 A1* | 2/2019 | Ma ...................... G06F 9/45558 |
| 2019/0086948 A1* | 3/2019 | Bhandari .................. G06F 1/06 |
| 2019/0087215 A1* | 3/2019 | Bhandari .................. G06F 1/14 |
| 2019/0260568 A1 | 8/2019 | Pepper et al. |
| 2020/0177660 A1 | 6/2020 | Connor et al. |
| 2022/0050495 A1* | 2/2022 | Bismuth .................. G06F 1/12 |
| 2022/0116373 A1 | 4/2022 | Soo et al. |
| 2022/0284112 A1 | 9/2022 | Seader et al. |

OTHER PUBLICATIONS

U.S. Appl. No. 17/456,511, filed Nov. 24, 2021, Katz et al.
U.S. Notice of Allowance dated Jul. 10, 2023 in U.S. Appl. No. 17/456,511.
U.S. Non-Final Office Action dated Feb. 10, 2023 in U.S. Appl. No. 17/456,511.

* cited by examiner

| Client ID 302-1 | Index 6 |
| Client ID 302-2 | Index 22 |
| Client ID 302-3 | Index 10 |
| Client ID 302-4 | Index 22 |
| Client ID 302-5 | Index 4 |
| Client ID 302-6 | Index 10 |
| Client ID 302-7 | Index 4 |
| Client ID 302-8 | Index 8 |
| Client ID 302-9 | Index 22 |
| ... | ... |
| Client ID 302-xx | Index 205 |

PHYSICAL HARDWARE CLOCK VIRTUALIZATION

BACKGROUND

Modern computing systems can have multiple virtual processors running on the same hardware processor. Each virtual processor running on the hardware processor can execute independent processes and tasks such as independent applications. The independent processes may not be aware that they are being executed on shared hardware. A virtual machine can be implemented using one or more virtual processors. In a cloud computing environment, multiple virtual machines can be implemented to allow different clients to run different client applications concurrently on the same shared hardware.

BRIEF DESCRIPTION OF THE DRAWINGS

Various embodiments in accordance with the present disclosure will be described with reference to the drawings, in which.

DETAILED DESCRIPTION

Processes and tasks running on a virtualized processor may utilize a physical hardware clock (PHC) for a variety of purposes. For example, the physical hardware clock can be used to insert a timestamp into an application. The physical hardware clock can be used to schedule certain events, or to trigger periodic execution of tasks. The physical hardware clock can also be used to synchronize different components and/or tasks running on the system. In a virtualized environment, the hardware platform may have just one physical hardware clock that is used by the multiple virtual processors. However, not all processes and tasks may use the same clock frequency to provide time information. To provide different virtual processors or different processes with a different logical clock, software can be used to convert the physical hardware clock to time information suitable for a particular client. However, such software conversion can lead to inaccurate time information due to software execution latency. Another option is to implement a physical hardware clock for each virtual processor. However, such logic duplication may not scale well when there are a large number of virtual processors, and may result in a significant increase in chip area and power consumption.

To provide support for multiple clocks without duplicate logic circuitry, a physical hardware clock can be virtualized to support multiple clock frequencies. The physical hardware clock can be implemented using a counter that increments at a base clock frequency generated from a phase-locked loop (PLL). Each virtualized clock can be represented as a linear function of the base clock. For example, to support a different clock for each virtual processor in a virtualized environment, each virtual processor can assign its own coefficients to model a suitable clock frequency for that virtual processor. When a task executing on the virtual processor requires time information, a timestamp request with a client identifier is sent to the physical hardware clock. The physical hardware clock can select the coefficients associated with the virtual processor based on the client identifier and compute the requested timestamp in hardware. The timestamp computed from the selected coefficients reflects the clock frequency used by the virtual processor. In this manner, a single physical hardware clock can be virtualized to support multiple virtual processors running on the system without a significant increase in chip area and without relying on software to derive the virtualized clocks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
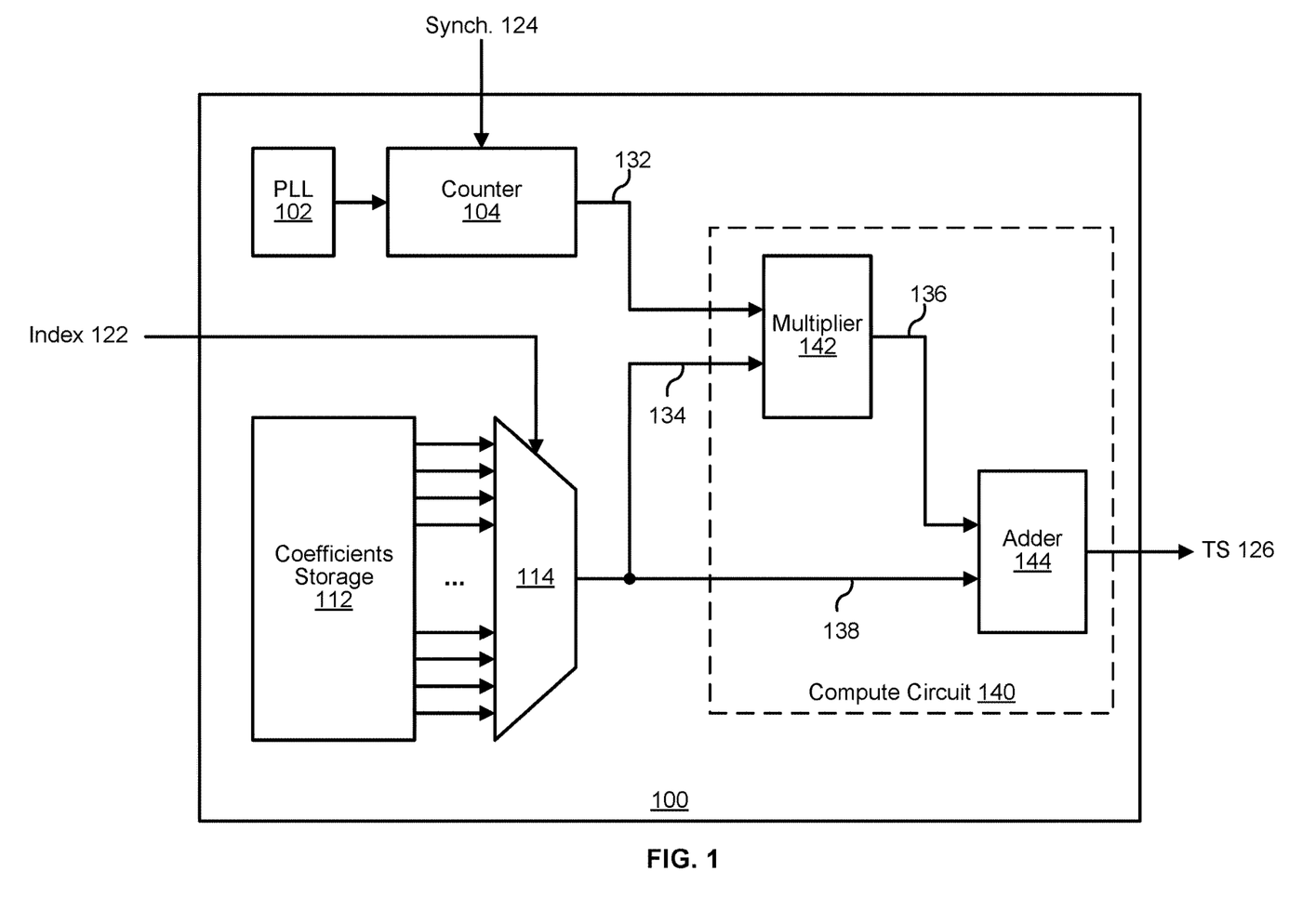
FIG. 1 illustrates a block diagram of an example of an integrated circuit device, according to certain aspects of the disclosure.

FIG. 1 illustrates a block diagram of an example of an integrated circuit device 100. Integrated circuit device 100 can be a clock circuitry block of a computing system such as a system-on-chip (SoC). Integrated circuit device 100 can be used to implement a physical hardware clock that can be virtualized to provide time information for multiple clients such as multiple virtual processors. Integrated circuit device 100 includes a phase-locked loop (PLL) 102, a counter 104, coefficients storage 112, a selection circuit 114, and a compute circuit 140.

PLL 102 can be implemented, for example, using a voltage-controlled oscillator to generate a base clock frequency for integrated circuit device 100. In some implementations, the base clock frequency can be, for example, at or within a magnitude of the maximum clock frequency used in the computing system supported by integrated circuit device 100. For instance, PLL 102 may provide a 1 GHz clock on a system than may use a maximum frequency of up to 4 GHz. The base clock frequency can also be several magnitudes smaller than the maximum clock frequency if fine resolution of the time information at the maximum frequency is not needed. The base clock signal generated by PLL 102 is provided to counter 104. Counter 104, being driven by the clock signal from PLL 102, is operable to generate a counter value 132 that is incremented at each clock period of the clock signal. The counter value 132 is provided to a compute circuit 140.

Coefficients storage 112 is operable to store multiple timestamp coefficient entries. Coefficients storage 112 can be implemented using, for example, a set of registers or a suitable memory. Each of the timestamp coefficient entries can include coefficients or calculation parameters that are used to derive a virtualized clock from the base clock. For example, if the virtualized clock is represented as a linear function of the base clock, then the coefficients stored in a timestamp coefficient entry can include a timestamp scaling factor and a timestamp offset. In some implementations, the number of timestamp coefficient entries stored in coefficients storage 112 may correspond to the number of virtual processors implemented by the computing system. For example, if the computing system supported by integrated circuit device 100 can provide up to 256 virtual processors, coefficients storage 112 may store up to 256 timestamp coefficient entries to provide one entry per virtual processor. In other words, each of the timestamp coefficient entries can be associated with a corresponding virtual processor of the computing system. In other implementations, the number of timestamp coefficient entries in coefficients storage 112 may include a timestamp coefficient entry per client, or some other predetermined number of entries.

The timestamp coefficients of an entry (e.g., timestamp scaling factor and timestamp offset) can be configured and controlled by the virtual processor associated with the entry. For example, when a virtual processor is assigned to a virtual machine instance, the configuration parameters used for initializing the virtual machine instance can include the coefficients to convert the base clock to the virtual clock used by the virtual processor, and the coefficients can be written to the corresponding timestamp coefficient entry in coefficients storage 112. The coefficients can also be updated by the virtual processor during operation, for example, if the virtual processor switches to a different task that uses a different clock.

When time information is needed by a client (e.g., a process running on a virtual processor), a timestamp request is sent to integrated circuit device 100. The timestamp request may include a client identifier to identify the requester. An index 122 corresponding to the client identifier can be used as a selection signal to select the corresponding timestamp coefficient entry in coefficients storage 112 for the particular timestamp requester. In some implementations, the client identifier can be used as index 122 itself, or index 122 can be derived from the client identifier. For example, a mapping table that maps client identifiers to index values can be used to derive index 122 from the client identifier. Index 122 is provided to selection circuit 114.

Selection circuit 114 is operable to select a timestamp coefficient entry from coefficients storage 112 using index 122, which is based on the timestamp request. In implementations in which coefficients storage 112 is implemented as a set of registers, selection circuit 114 can be implemented as a multiplexer as shown, in which index 122 is used as a selection signal to select one of the timestamp coefficient entries stored in coefficients storage 112. As another example, coefficients storage 112 can be implemented as a memory, and selection circuit 114 can be implemented as a memory interface. In such implementations, index 122 can be used as an address to read the timestamp coefficient entry from coefficients storage 112.

The selected timestamp coefficient entry is then provided to compute circuit 140. Compute circuit 140 is operable to compute a timestamp based on the selected timestamp coefficient entry and the counter value 132 provided by counter 104. By way of example, in implementations in which the virtual clock is represented as a linear function of the base clock, the coefficients in the selected timestamp coefficient entry can include a timestamp scaling factor and a timestamp offset. The timestamp scaling factor can represent the slope of the linear function, and the initial timestamp offset can represent the starting time point. Given these coefficients, the requested timestamp or client timestamp (TS) can be computed as:

Client TS=(TS Scaling Factor×Counter Value)+TS Offset

Hence, for a linear function, compute circuit 140 may include a multiplier circuit 142 to multiply the timestamp scaling factor 134 with the counter value 132 to generate a multiplication result 136, and an adder circuit 144 to add the multiplication result 136 to the timestamp offset 138 to generate the timestamp output 126.

In some implementations, the timestamp scaling factor can be a fixed-point value having an integer or whole seconds portion, and a fraction or subseconds portion. For example, the timestamp scaling factor can be an 80-bit fixed point value, with the integer portion being the 2 most significant bits (MSBs), and the fraction portion being the remaining 78 least significant bits (LSBs). Hence, the timestamp scaling factor can have a range from $2^{-78}$ to 4. For a virtual clock that operates at half the base clock frequency, the timestamp scaling factor can be represented as 0x2000_0000_0000_0000_0000, in which the fraction bit representing $2^{-1}$ is set to one and all remaining bits are set to zero to yield a scaling factor of 0.5. In other implementations, the number of bits used for the timestamp scaling factor, the number of bits allocated for the integer portion and/or the number of bits allocated for the fraction portion can be different than the example above. The timestamp offset may represent an offset value scaled according to the virtual clock. In some implementations, the timestamp offset can have the same number of bits as the timestamp scaling factor.

Referring to FIG. 1, the base clock signal generated by PLL 102 can exhibit jitter or drift to cause inaccurate time information over long periods. To correct for such potential inaccuracies, counter 104 can be synchronized with a high precision synchronization signal 124 provided from a stable source. The synchronization signal 124 can be a periodic signal that is asserted at a periodic interval, and counter 104 can be reset to 0 and restarted according to the periodic signal. In some implementations, synchronization signal 124 can be a pulse-per-second (PPS) signal. The PPS signal can be provided, for example, from the network such as from a network time protocol (NTP) sever, and counter 104 can be reset every second using the PPS signal 124. Hence, counter 104 may count from 0 to 1 second in the granularity of the clock period of the base clock signal generated from PLL 102, and is restarted from 0 every second. In this manner, any jitter or drift on the base clock signal can be corrected every second.

In implementations in which the synchronization signal 124 is used to synchronize counter 104, the timestamp coefficient entries including their corresponding timestamp offset value 138 and/or timestamp scaling factor 134 in coefficients storage 112 can also be updated according to the synchronization signal 124. For example, because counter 104 provides a counter value between the synchronization period (e.g., between 0 and 1 second in the case of PPS signal), the timestamp offset value 138 being added to the multiplication result 136 may need to account for any elapsed time beyond the synchronization period. For instance, if the virtual clock corresponding to a timestamp coefficient entry is operating at 500 MHZ, the timestamp offset can be increment by $500 \times 10^6$ at every second in response to the PPS signal. In this manner, the computed timestamp output 126 can reflect a value as if counter 104 is continuously incrementing.

It should be noted that the linear function is just one example of how a virtual clock can be represented as a function of the base clock. In other implementations, the virtual clocks of the system can be represented using other types of functions being applied to the base clock. For example, a virtual clock can be represented as a polynomial function of the base clock. In such implementations, each timestamp coefficient entry may store the polynomial coefficients used to derive the virtual clock from the based clock, and the compute circuit may include polynomial computation circuitry such as a chain of multiply-and-add compute circuits to calculate a timestamp from the counter value.

Figure 2:
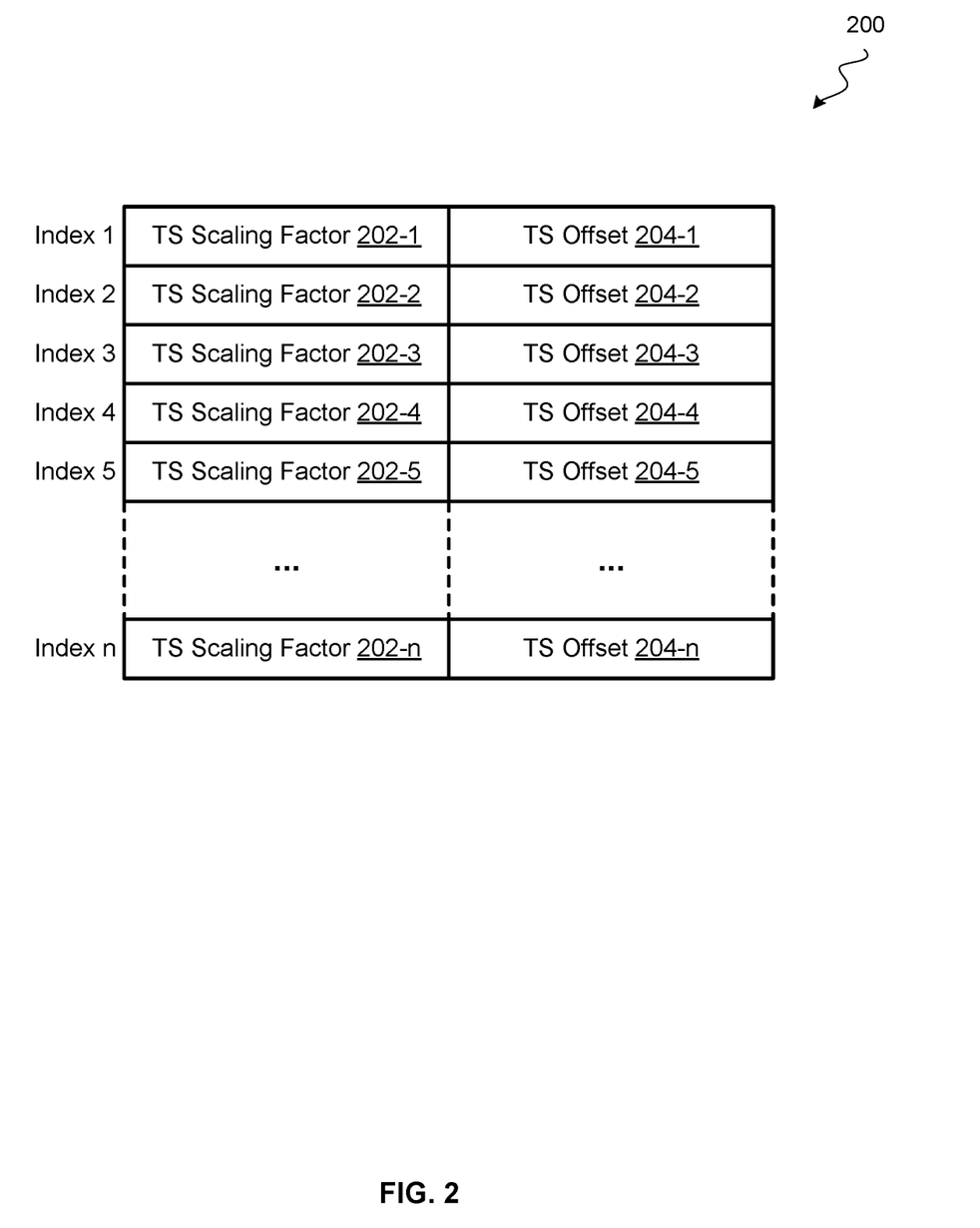
FIG. 2 illustrates a diagram of an example of coefficients storage, according to certain aspects of the disclosure.

FIG. 2 illustrates an example of a coefficients storage 200. Coefficients storage 200 can be used, for example, to implement coefficients storage 112. Coefficients storage 200 can store a number of timestamp coefficient entries. In the example shown, coefficients storage 200 includes n number of timestamp coefficient entries. In some implementations, the number of timestamp coefficient entries can be equal to the number of virtual processors supported by the physical hardware clock. Thus, for a platform that supports 256 virtual processors, coefficients storage 200 may contain 256 timestamp coefficient entries such that each virtual processor has access to its own virtual clock. Coefficients storage 200 can also store a timestamp coefficient entry per client (e.g., per process, per application, etc.). In some implementations, coefficients storage 200 can store some other predetermined number of timestamp coefficient entries that is shared by the different clients and/or virtual processors. For example, coefficients storage 200 may store only unique timestamp coefficients, and clients and/or virtual processors that use the same virtual clock frequency can referent the same timestamp coefficient entry. In some implementations, the timestamp coefficient entries can be swapped out or updated based on which clients are expected to request a timestamp in the near future.

Each of the timestamp coefficient entries in coefficients storage 200 is associated with an index value. In some implementations, coefficients storage 200 can be implemented as a set of registers, and the index value associated with a timestamp coefficient entry can be used to select the corresponding timestamp coefficient entry. Coefficients storage 200 can also be implemented as a memory, and the index associated with each timestamp coefficient entry can be used as an address to access the timestamp coefficient entry. In some implementations, coefficients storage 200 can be implemented as a content-addressable memory in which the index is stored in the memory and is used to retrieve the timestamp coefficient entry.

In the example shown in FIG. 2, the virtual clocks are represented as linear functions of the base clock. As such, each timestamp coefficient entry includes a timestamp scaling factor and a timestamp offset. For example, the timestamp coefficient entry at Index 1 includes Timestamp Scaling Factor 202-1 and Timestamp Offset 204-1; the timestamp coefficient entry at Index 2 includes Timestamp Scaling Factor 202-1 and Timestamp Offset 204-1; and so on. The last timestamp coefficient entry at Index n includes Timestamp Scaling Factor 202-$n$ and Timestamp Offset 204-$n$. The bit lengths of the timestamp scaling factor and the timestamp offset can be the same as show, or they can be different. The timestamp scaling factor may include an integer portion and a fraction portion to represent the slope of the linear function being applied to the base clock to derive the virtual clock. In some implementations, the timestamp scaling factor may not have an integer portion (e.g., if the base clock is already running at the maximum frequency used in the system).

The timestamp offset can be a starting value that is adjusted to the scale of the virtual clock. For example, if the virtual clock operates at 500 MHz and the initial starting time is 2 ms, the timestamp offset may have a value of $10^6$, because there are $10^6$ clock ticks in 2 ms for a 500 MHz clock. For some applications or processes, the timestamp offset may have an initial value of 0. In applications in which a certain time format is used, the timestamp offset may have an initial value representing the elapsed time since the beginning of the epoch for the time format. For example, if the timestamp is in NTP format with a starting epoch on Jan. 1, 1900, the initial timestamp offset can be a value representing the number of virtual clock ticks since Jan. 1, 1900. The timestamp offset stored in a timestamp coefficient entry can be updated or incremented, for example, when the counter is reset to keep track of the elapsed time since the last counter reset.

Figure 3:
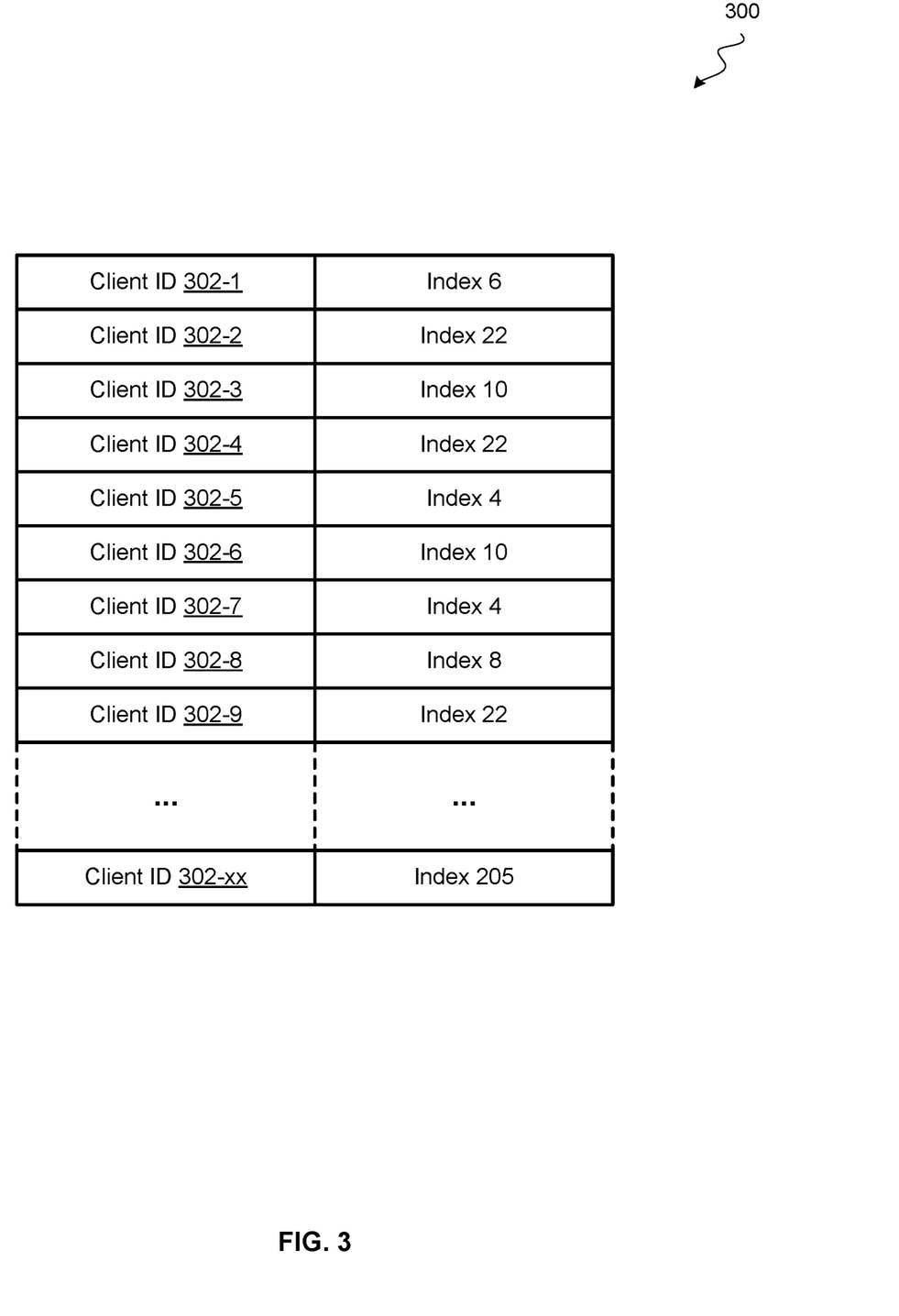
FIG. 3 illustrates a diagram of an example of a mapping table, according to certain aspects of the disclosure.

FIG. 3 illustrates an example of a client identifier mapping table 300. A client identifier may correspond to a process, task, or application executing on the system that is requesting time information. In some implementations, a client identifier may also correspond to a hardware component in the system that is requesting time information. When the physical hardware clock receives a timestamp request, the timestamp request may include a client identifier to identifier the requester of the timestamp. The timestamp request can be in the form of a packet, and the client identifier can be embedded in the header of the packet. In some implementations, the client identifier can be part of a source address, or be implemented as user definable bits of a packet or message.

As mentioned above, in some implementations, each timestamp coefficient entry may correspond to a virtual processor. In such scenarios, different processes executing on the virtual processor may have a different client identifier associated with it, but the different processes may use the same virtual clock for the virtual processor. As such, there can be multiple client identifiers that map to the same index value to select the corresponding timestamp coefficient entry from the coefficients storage. By way of example, referring to FIG. 3, Client ID 302-2, Client ID 302-4, and client ID 302-9 can be different processes executing on the same virtual processor. Each of these client identifiers can be mapped to the same index value of Index 22 because each of these processes uses the same virtual clock. Similarly, Client ID 302-3 and Client ID 302-6 may map to the same index value of Index 10. Accordingly, although coefficients storage may have a certain number of timestamp coefficient entries, the physical hardware clock can support a greater number for clients that can submit a timestamp request by implementing a client identifier mapping table such as table 300.

In some implementations, to minimize the storage requirements of the coefficients storage, the coefficients storage may store only unique coefficients (e.g., for unique clock frequencies used in the system) to eliminate any duplicate entries. Hence, clients running on different virtual processors may nevertheless be mapped to the same index if they use the same virtual clock frequency. In such implementations, client identifier mapping table 300 can be used to map different clients that use the same clock frequency to the timestamp coefficient entry for that frequency.

Client identifier mapping table 300 can be updated during runtime to reflect the active processes. As new processes are started, new client identifiers can be added to the table. As processes are terminated, client identifiers can be removed from the table. Client identifier mapping table 300 provides the flexibility to share a timestamp coefficient entry with multiple timestamp requesters.

Figure 4:
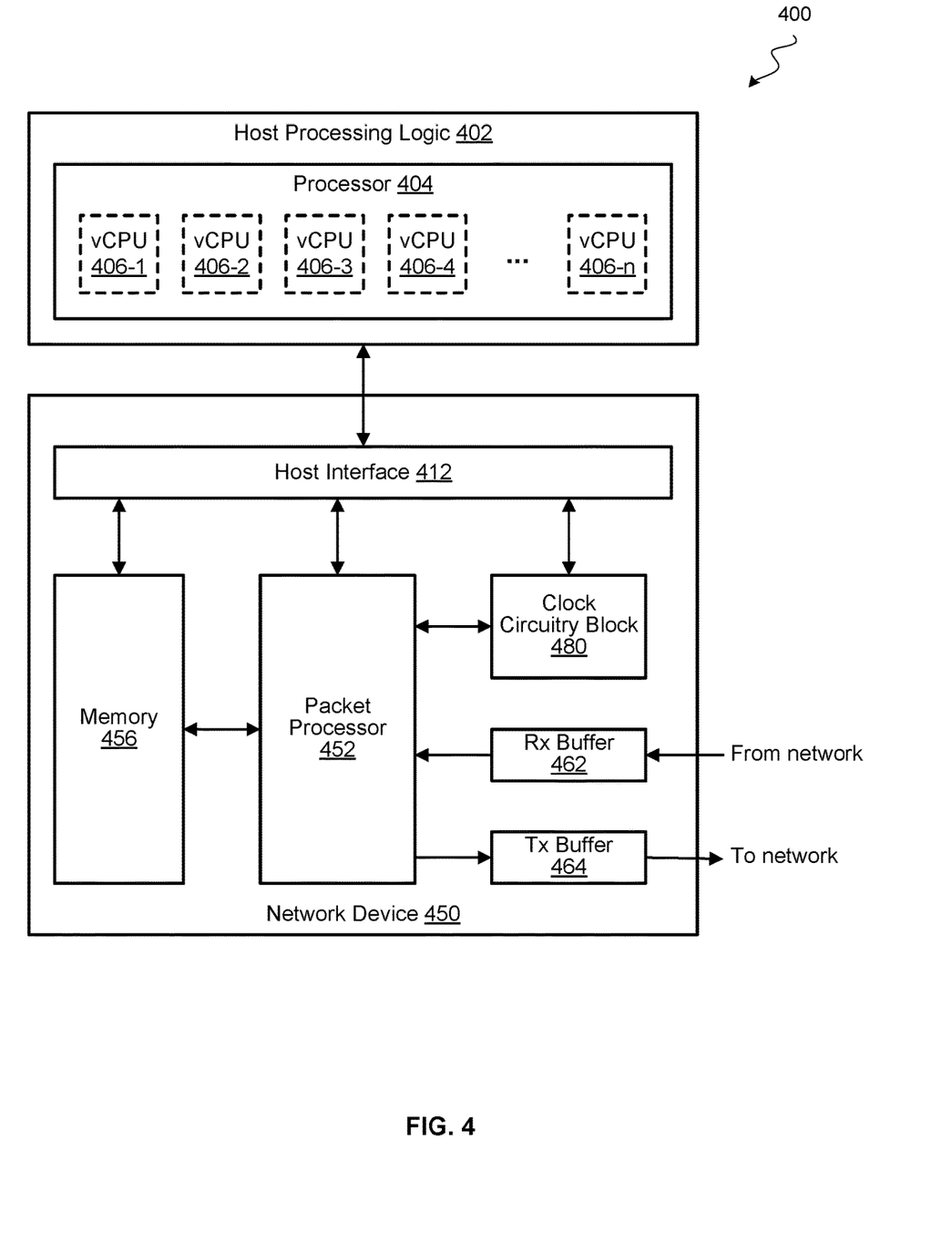
FIG. 4 illustrates a block diagram of an example of a computing system, according to certain aspects of the disclosure.

FIG. 4 illustrates a simplified block diagram of an example of a computing system 400. Computing system 400 may include host processing logic 402 coupled to a network device 450. Computing system 400 may include additional components not specifically shown. Host processing logic 402 may include a hardware processor 404. Processors 404 can be a general-purpose processor or other types of processor capable of executing software code such as an operating system and/or various software applications. A processor may also include multiple processing cores to provide multiple execution threads. Processor 404 can be virtualized to implement multiple virtual processors 406-1 to 406-n. The virtual processors 406-1 to 406-n can execute independent processes and tasks, and each virtual processor may not be aware that it is being executed on shared hardware. In some implementations, one or more virtual processors can be assigned to a virtual machine to run client applications.

Host processing logic 402 can be coupled to a network device 450 via a communication bus coupled to host interface 412. The host interface can be implemented, for example, using a standardized bus protocol such as one or more variations of the Peripheral Component Interconnect (PCI) standard bus protocols. The PCI family of protocols may include the original PCI standard, PCI-eXtended (PCI-X), Accelerated Graphics Port (AGP), and PCI Express (PCIe, also referred to as PCI-XP), etc. The term "PCI" or "PCI-based" may be used herein to describe any protocol in the PCI family of bus protocols. Other bus protocols that can be used may include, for example, Industry Standard Architecture (ISA), Extended ISA (EISA), Video Electronics Standards Association (VESA), Micro Channel, and any of the Advanced Technology Attachment (ATA) family of protocols, among others. The communication between network device 450 and the host components can also be implemented with a combination of standard bus protocols, a combination of proprietary bus protocols, and/or a combination of standard and proprietary bus protocols.

Network device 450 is an example of an integrated circuit device that may include a physical hardware clock. Network device 450 can be, for example, a network interface card (NIC), and may include a packet processor 452, a receive buffer 462, a transmit buffer 464, a memory 456, and clock circuitry block 480. In some implementations, network device 450 may omit one or more components, and/or may include one or more components not specifically shown. Packet processor 452 can be implemented using, for example, one or more processors, one or more field programmable gate arrays (FPGAs), one or more suitable application specific integrated circuits (ASICs), or a combination thereof. Packet processor 452 can be configurable to process network packets according to multiple network protocols. The multiple network protocols supported by packet processor 452 may include different protocols at the same protocol layer (e.g., different L2 protocols, different L3 protocols, different transport layer protocols, etc.), and/or protocols at different network layers (e.g., to generated nested protocol packets).

Packet processor 452 may generate packets for transmission to a network via transmit buffer 464. For example, packet processor 452 may generate a network packet by obtaining data from host memory 410, generating a packet header (e.g., by populating fields in a packet header), and concatenating the packet header with the data as the payload into a network packet according to the protocol of the network that the network packet is being transmitted on. Depending on the protocol, the packet header may include fields such as a source address, a destination address, packet length, sequence number, and/or other information utilized by the network to route and process packets. In some implementations, packet processor 452 may also generate error checking information such as a frame check sequence or a cyclic redundancy check code that is inserted into the header or appended to the data payload. Packet processor 452 may also set control fields or control bits, for example, to indicate start and end of the network packet.

Packet processor 452 may also process network packets received from a network via receive buffer 462, and provide the data payload to host processing logic 402. For example, packet processor 452 may process a received network packet from the network by parsing and extracting the header fields, and performing error checks on the network packet such as verifying the sequence number and error checking information. Packet processor 452 may then remove the header and other information not needed by the host processing logic 402 from the received network packet and provide the data payload to host processing logic 402.

Network device 450 also includes clock circuitry block 480. Clock circuitry block 480 can be implemented, for example, using integrated circuit device 100 and provides a physical hardware clock for computing system 400. The single physical hardware clock provided by clock circuitry block 480 can be used to support a virtual clock for each of the virtual processors 406-1 to 406-n, as well as for other hardware/software components of computing system 400. In the implementation shown, clock circuitry block 480 is provided in network device 450 in close proximity to receive buffer 462 and transmit buffer 464. This allows accurate time information to be inserted into packets transmitted onto the network. Packets received from the network can also be tagged with accurate time-of-arrival information.

In some implementations, when a packet is received by network device 450, it may not be immediately known as to which client or task that the packet is intended for. As such, rather than computing a timestamp for all possible clients, the counter value generated by the counter in clock circuitry block 480 can be latched and stored in a storage circuit at the time the packet is received. The counter value can be stored until at least the received packet has been processed (e.g., by packet processor 452, or host processing logic 402) to determine the client identifier associated with the packet. For example, the packet can be parsed to obtain a header field such as a destination address or user defined field, and the header field can be used to look up an associated client identifier. Upon determining the client identifier associated with the received packet, the timestamp coefficient entry can be selected using the client identifier associated with the packet, and the timestamp can be generated thereafter.

Implementing clock circuitry block 480 in network device 450 also allows the components in computing system 400 to send timestamp requests using a packetized interface. The timestamp requests from any of the virtual processor and/or other hardware/software components of computing system 400 can be sent to clock circuitry block 480 via host interface 412 in packetized form. Implementing clock circuitry block 480 in network device 450 also provides a convenient location for clock circuitry block 480 to receive a synchronization signal (e.g., PPS signal) from the network. It should be understood that in other implementations, clock circuitry block 480 can be provided on a different component of computing system 400. For example, clock circuitry block can be provided on the host system or on a different peripheral component coupled to the host system.

Figure 5:
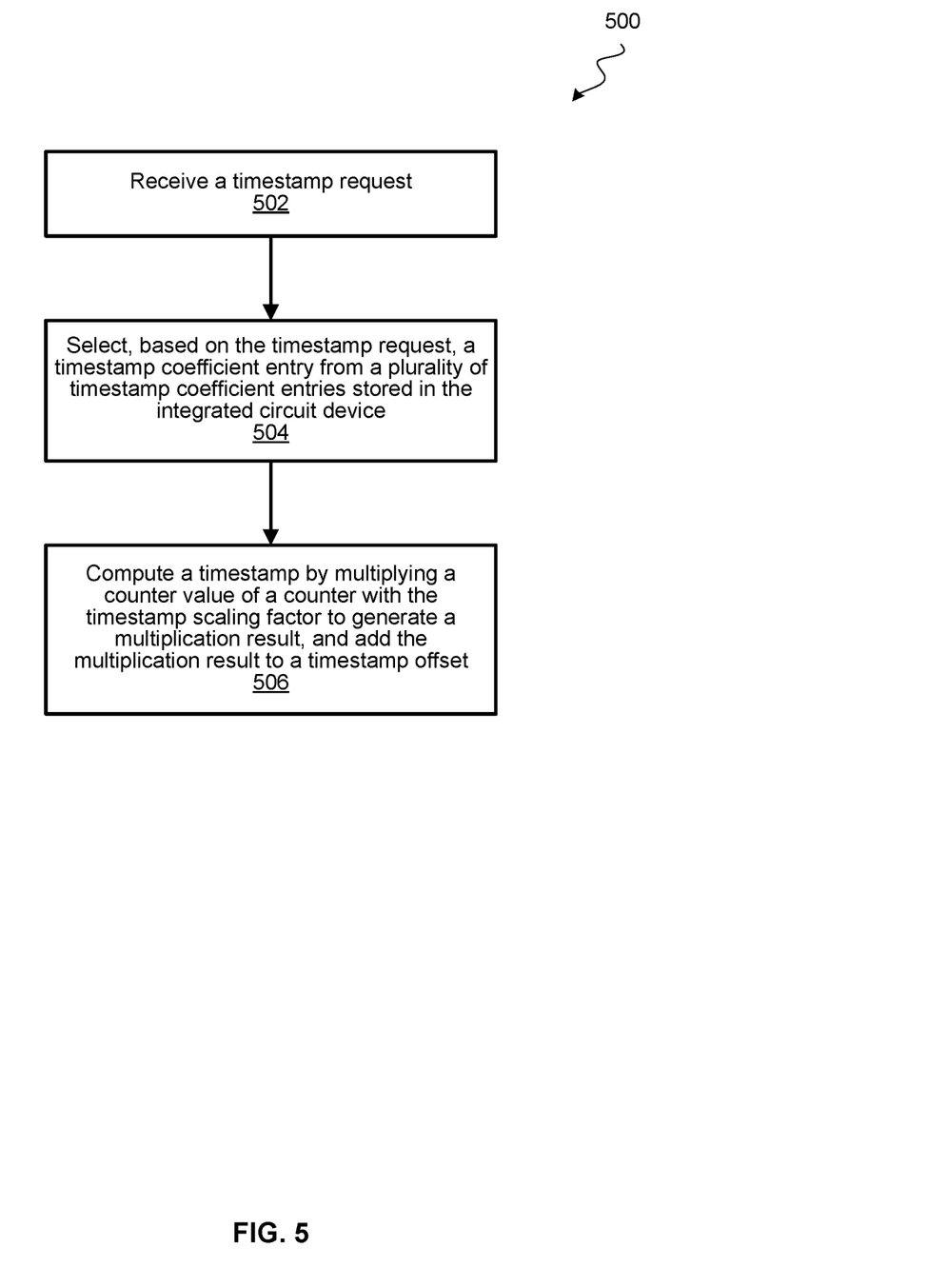
FIG. 5 illustrates a flow diagram of an example of a process to generate virtual clock information, according to certain aspects of the disclosure.

FIG. 5 illustrates a flow diagram of an example of a process 500 for providing virtual clock information in the form of a generated timestamp. Process 500 can be performed, for example, by a physical hardware clock, which can be implemented using integrated circuit device 100. In some implementations, the physical hardware clock is provided on a network device. Process 500 can be performed to generate a timestamp according to the virtual clock frequency of a client requesting the timestamp. The client requesting the timestamp can be, for example, a process, a task, an application, a virtual processor, a virtual machine, or a hardware component of a computing system.

Process 500 may begin at block 502 by receiving a timestamp request at an integrated circuit device. The timestamp request may include a client identifier identify the requester of the timestamp. In some implementations, the timestamp request can be in the form of a packet, and the client identifier can be embedded in a header field of the packet.

At block 504, a timestamp coefficient entry is selected from timestamp coefficient entries stored in the integrated circuit device. The timestamp coefficient entry can be selected based on the timestamp request. For example, a client identifier can be obtained or parsed from the timestamp request, and an index that is mapped to the client identifier can be determined, for example, from a mapping table. The index can then be used to select the corresponding timestamp coefficient entry from a coefficients storage in the integrated circuit device. For example, the index value can be used as a selection signal, or be used as an address to retrieve the timestamp coefficient entry. The timestamp coefficient entry may include a timestamp scaling factor and a timestamp offset.

At block 506, a timestamp is computed by multiplying a counter value of a counter running at the base clock frequency of the physical hardware clock with the timestamp scaling factor to generate a multiplication result, and adding the multiplication result to the timestamp offset of the selected timestamp coefficient entry. The computation can be performed by a compute circuit of the integrated circuit device, which may include a multiplier circuit and an adder circuit. The computed timestamp can then be returned to the sender of the timestamp request.

In some implementations, the integrated circuit device may receive a periodic synchronization signal such as a PPS signal. The counter running at the base clock frequency can be reset, and be restarted in response to receiving the periodic synchronization signal. The timestamp offset stored in the timestamp coefficient entries can also be updated in response to receiving the periodic synchronization signal to account for the elapsed time since the previous counter reset.

The initial values of a timestamp coefficient entry can be programmed, for example, when a virtual machine instance is initialized. For example, when a virtual machine instance is initialized, one of the timestamp coefficient entries in the coefficients storage can be mapped to the virtual machine instance. The timestamp coefficient entry can be mapped, for example, to a client identifier of a process to be executed on the virtual machine instance. The timestamp coefficient entry can be programmed with the coefficients to convert the base clock of the physical hardware clock to the virtual clock frequency used by the process.

Accordingly, the techniques disclosed herein can be used to virtualize a single physical hardware clock to provide time information according to different clock frequencies for different virtual processors of a computing system. The additional virtual clocks supported by the hardware does not require a significant increase in chip area. Such techniques can also provide more accurate time information than software-based clock conversions because the hardware implementation can provide the requested time information with much lower latency.

Figure 6:
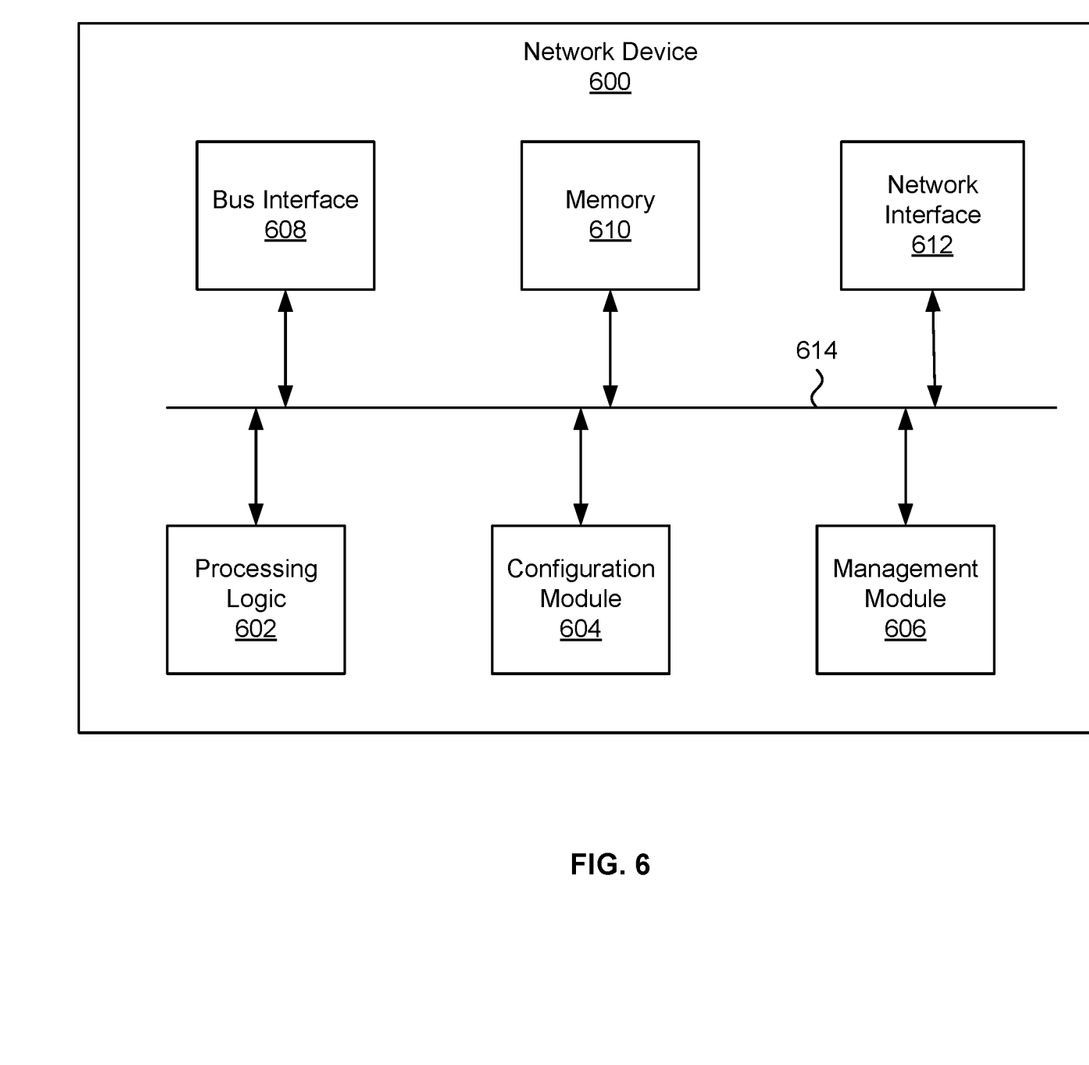
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. For example, in some implementations, network device 600 may include integrated circuit device 100 (not shown in FIG. 6) to provide a physical hardware clock for a computing system. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload.

The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 7. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
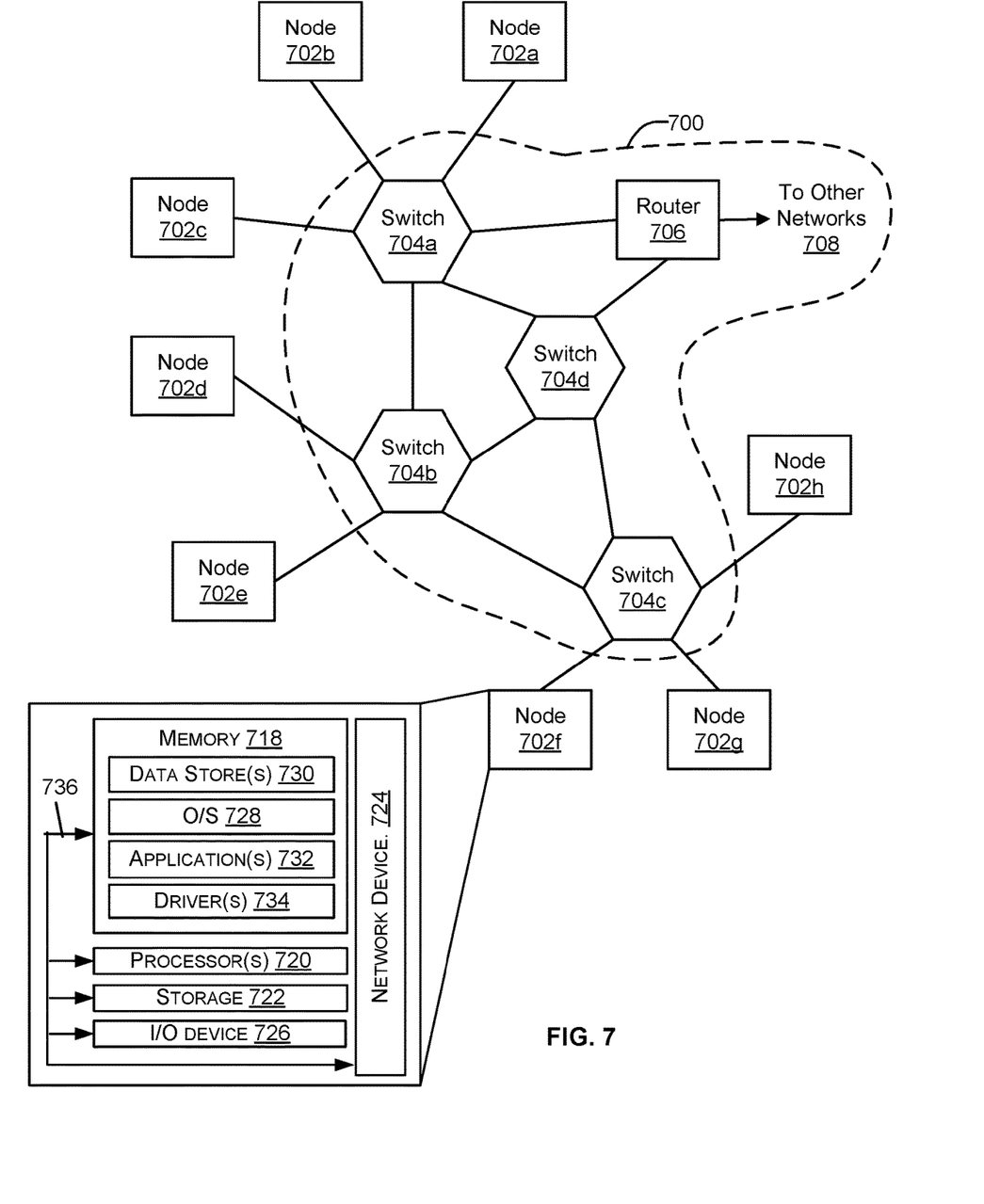
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702a-702h may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702a-702h, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702a-702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments May become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
    a host interface operable to receive timestamp requests from virtual machines executing on a host system; and
    a clock circuitry block including:
        a counter driven by a clock signal to generate a counter value;
        a coefficients storage storing a plurality of timestamp coefficient entries, each of the timestamp coefficient entries being associated with an index, and including a timestamp scaling factor and a timestamp offset;
        a selection circuit operable to select a timestamp coefficient entry from the coefficients storage based on which index is mapped to a client identifier included in a timestamp request received on the host interface, wherein multiple client identifiers are mapped to the index of the selected timestamp coefficient entry; and
        a compute circuit operable to generate a timestamp by adding the timestamp offset of the selected timestamp coefficient entry to a result of multiplying the counter value with the timestamp scaling factor of the selected timestamp coefficient entry.

2. The network device of claim 1, wherein the counter is reset periodically using a pulse-per-second signal.

3. The network device of claim 2, wherein each timestamp coefficient entry including the timestamp scaling factor and the timestamp offset is updated using the pulse-per-second signal.

4. The network device of claim 1, wherein the multiple client identifiers mapped to the index of the selected timestamp coefficient entry include client identifiers of clients that are executing on different virtual processors.

5. An integrated circuit device comprising:
    a coefficients storage operable to store a plurality of timestamp coefficient entries each associated with an index;
    a selection circuit operable to select a timestamp coefficient entry from the coefficients storage in response to a timestamp request that includes a client identifier, wherein the timestamp coefficient entry is selected based on which index is mapped to the client identifier, and wherein multiple client identifiers are mapped to the index of the selected timestamp coefficient entry;
    a counter operable to generate a counter value; and
    a compute circuit operable to compute a timestamp based on the selected timestamp coefficient entry and the counter value.

6. The integrated circuit device of claim 5, wherein each of the timestamp coefficient entries includes a timestamp scaling factor and a timestamp offset.

7. The integrated circuit device of claim 6, wherein the compute circuit includes:
    a multiplier to multiply the timestamp scaling factor with the counter value to generate a multiplication result; and
    an adder to add the multiplication result to the timestamp offset to generate the timestamp.

8. The integrated circuit device of claim 5, wherein the timestamp request is provided as a packet, and wherein the client identifier is included in a header of the packet.

9. The integrated circuit device of claim 5, wherein mappings of client identifiers to indices are stored in a mapping table that is updated during runtime to reflect active processes.

10. The integrated circuit device of claim 5, wherein the multiple client identifiers mapped to the index of the selected timestamp coefficient entry include client identifiers of clients that are executing on different virtual processors.

11. The integrated circuit device of claim 5, wherein the counter is operable to be reset according to a synchronization signal.

12. The integrated circuit device of claim 11, wherein the selected timestamp coefficient entry is updated according to the synchronization signal.

13. The integrated circuit device of claim 11, wherein the synchronization signal is a periodic signal.

14. The integrated circuit device of claim 12, wherein the synchronization signal is a pulse per second (PPS) signal.

15. The integrated circuit device of claim 5, wherein each of the timestamp coefficient entries is associated with a corresponding virtual processor of a computing system.

16. A method comprising:
   receiving, by an integrated circuit device storing a plurality of timestamp coefficient entries each associated with an index, a timestamp request;
   selecting, by the integrated circuit device based on the timestamp request, a timestamp coefficient entry from the plurality of timestamp coefficient entries, the timestamp coefficient entry including a timestamp scaling factor and a timestamp offset, wherein selecting the timestamp coefficient entry includes:
      obtaining a client identifier from the timestamp request;
      determining an index that is mapped to the client identifier; and
      using the index to select the timestamp coefficient entry, wherein multiple client identifiers are mapped to the index of the selected timestamp coefficient entry; and
   computing a timestamp by multiplying a counter value of a counter with the timestamp scaling factor to generate a multiplication result, and adding the multiplication result to a timestamp offset.

17. The method of claim 16, further comprising:
   receiving a periodic synchronization signal; and
   resetting the counter in response to receiving the periodic synchronization signal.

18. The method of claim 17, further comprising:
   updating the selected timestamp coefficient entry in response to receiving the periodic synchronization signal.

19. The method of claim 16, wherein the multiple client identifiers mapped to the index of the selected timestamp coefficient entry include client identifiers of clients that are executing on different virtual processors.

20. The method of claim 16, further comprising:
   initializing a virtual machine instance;
   mapping one of the plurality of timestamp coefficient entries to the virtual machine instance; and
   programming that timestamp coefficient entry mapped to the virtual machine instance.

21. The method of claim 16, further comprising:
   receiving, by the integrated circuit device, a packet;
   latching the counter value in a storage circuit in response to receiving the packet; and
   storing the counter value until at least the packet has been processed to determine a client identifier associated with the packet,
   wherein the timestamp is generated after the client identifier associated with the packet has been determined.

* * * * *